United States Patent
Perez

(10) Patent No.: US 11,153,155 B1
(45) Date of Patent: *Oct. 19, 2021

(54) SYSTEM AND METHOD FOR AGNOSTIC ZERO TOUCH PROVISIONING OF CUSTOMER PREMISES EQUIPMENT

(71) Applicant: XFactor Networks, LLC, Mesa, AZ (US)

(72) Inventor: Daniel Xavier Perez, Mesa, AZ (US)

(73) Assignee: XFACTOR NETWORKS, LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,500

(22) Filed: May 13, 2020

Related U.S. Application Data

(63) Continuation-in-part of application No. 16/141,852, filed on Sep. 25, 2018, now Pat. No. 10,686,657, which is a continuation of application No. 15/222,198, filed on Jul. 28, 2016, now abandoned.

(51) Int. Cl.
 *H04L 12/24* (2006.01)

(52) U.S. Cl.
 CPC ...... H04L 41/0809 (2013.01); H04L 41/0886 (2013.01)

(58) Field of Classification Search
 CPC ............ H04L 41/0809; H04L 41/0886; H04L 41/5041; H04L 41/509; H04L 47/28; H04L 51/32; H04L 21/26216; H04L 21/482; H04L 21/6181; H04L 21/632; G06T 19/006; H04W 24/02
 See application file for complete search history.

(56) References Cited

U.S. PATENT DOCUMENTS

| | | | |
|---|---|---|---|
| 7,197,550 B2 | 3/2007 | Cheline et al. | |
| 2002/0044567 A1 | 4/2002 | Voit | |
| 2002/0147833 A1 | 10/2002 | Richardson | |
| 2006/0050862 A1 | 3/2006 | Shen | |
| 2007/0127506 A1 | 6/2007 | Absillis | |
| 2007/0297396 A1 | 12/2007 | Eldar | |
| 2008/0147840 A1 | 6/2008 | Roelens | |
| 2009/0293079 A1* | 11/2009 | McKee | H04L 51/32 725/10 |
| 2010/0202441 A1 | 8/2010 | Haag | |

(Continued)

*Primary Examiner* — Le H Luu
(74) *Attorney, Agent, or Firm* — Booth Udall Fuller, PLC

(57) ABSTRACT

A method for zero-touch provisioning is disclosed. The method includes receiving a customer specification of network requirements exclusively specified for a CPE assigned to a specific customer at a specific customer premises. The CSNR includes information describing the premises and information describing an intended operation of the CPE. The method also includes storing a job assignment including a unique CPE identity and service information for the provisioning of the CPE. The identity is linked to the customer through the job assignment. The method also includes provisioning a class of service template exclusively for providing the intended operation of the CPE at the customer premises and paired with the CPE identity through the job assignment. The method also includes receiving a provisioning request sent by the CPE to a FQDN pointed at the ZTP server and including the CPE identity. Finally, the method includes pushing the COS template to the CPE.

20 Claims, 6 Drawing Sheets

(56) References Cited

U.S. PATENT DOCUMENTS

| | | |
|---|---|---|
| 2013/0268578 A1 | 10/2013 | Bose |
| 2014/0122674 A1 | 5/2014 | Gray et al. |
| 2016/0315808 A1 | 10/2016 | Saavedra |
| 2017/0055013 A1* | 2/2017 | Hasek .............. H04N 21/26216 |
| 2017/0272792 A1* | 9/2017 | Bachmutsky ........ H04N 21/632 |
| 2017/0366462 A1* | 12/2017 | Soelberg ................. H04L 47/28 |
| 2018/0132138 A1* | 5/2018 | Senarath ............ H04L 41/5041 |
| 2018/0234902 A1* | 8/2018 | Talbert ................. H04W 24/02 |
| 2018/0317134 A1* | 11/2018 | Leroux ................. H04W 24/02 |
| 2019/0014368 A1* | 1/2019 | Donoghue ........... H04N 21/482 |
| 2019/0028404 A1* | 1/2019 | Baker ................. H04L 41/0886 |
| 2019/0230178 A1* | 7/2019 | Hardin ................. H04L 41/509 |
| 2020/0162776 A1* | 5/2020 | Phillips ................ G06T 19/006 |
| 2020/0267513 A1* | 8/2020 | Zhu .................... H04N 21/6181 |

\* cited by examiner

SYSTEM AND METHOD FOR AGNOSTIC ZERO TOUCH PROVISIONING OF CUSTOMER PREMISES EQUIPMENT

RELATED APPLICATIONS

This application is a continuation-in-part of, and claims the benefit of U.S. Patent Application No. 62/141,852, filed Sep. 25, 2018 titled "Automatic Provisioning of Customer Premises Equipment", which is a continuation of, and claims the benefit of U.S. patent application Ser. No. 15/222,198 filed Jul. 28, 2016 titled "Automatic Provisioning of Customer Premises Equipment". The entirety of the above referenced disclosures is hereby incorporated herein by this reference.

TECHNICAL FIELD

Aspects of this document relate generally to automatically provisioning customer premises equipment (CPE).

BACKGROUND

Services such as voice, data, streaming video and other services are often provided to home and business customers/subscribers by telecom service providers, multichannel video programming distributors (MVPD) and so on. Customer premises equipment (CPE) may include various types of terminal equipment to process received MVPD signals to thereby enable subscribers to view, record, and interact with the services. Among the more common consumer electronics devices are television sets, set-top boxes, cable modems and personal video recorders. The CPE cooperates with an access network of the service provider to receive appropriate services thereby.

Traditionally, setting up CPE for customer involves a technician installing the CPE at the customer location, provisioning the CPE directly or by cooperating with service provider personnel at a service network management location, and testing the CPE to ensure that it works for its intended purpose, such as a set-top box (STB) and modem for customer receiving television, telecom and data services at home. The traditional CPE provisioning process is therefore time-consuming and expensive.

Automatic provisioning of CPE is desired to streamline the CPE provisioning process and reduce costs. Existing automatic provisioning techniques are based upon techniques developed for use in provisioning over telephones within the context of a 3G/4G mobile network environment.

However, the 3G/4G network environment for provisioning mobile telephones is the same everywhere in the mobile network, whereas the service provider network environment for provisioning a CPE is not only subject to significant differences depending upon location, there are also many more parameters to provision relevant CPE in such a network. That is, automatic provisioning of CPE within a service provider network requires the provisioning of many operating parameters, provisioning of operating parameters of enormous complexity as compared to mobile telephones, and the provisioning of these parameters within the context of local network conditions which may vary considerably and unexpectedly between locales.

Conventional methods for provisioning CPE units are often expensive and slow. In an ideal scenario, a customer may be requesting the provisioning of new services using new CPE units sourced from the network service provider. The network service provider will have a preferred set of equipment that their field technicians and back office personnel are adept at installing and configuring. However, even in such a scenario, the customer must wait for, and pay for, one or more field technicians to be on-site to begin a multi-step provisioning process for each CPE unit.

However, in many cases, the circumstances of provisioning new or modified network services are less than ideal for the network service provider. For example, many customers have invested in a collection of CPE units, and do not want the expense of replacing all of those units with hardware that is preferred by a new service provider. As a consequence, sometimes the service provider's field technicians are tasked with provisioning CPE units that they are unfamiliar with, requiring the assistance of install personnel from the original CPE vendor, further increasing cost and the length of the install.

SUMMARY

According to one aspect, a method for zero touch provisioning, performed by a zero touch provisioning (ZTP) server in a network, includes receiving a customer specification of network requirements (CSNR) exclusively specified for a customer premises equipment (CPE) belonging to a device family and assigned to a specific customer at a specific customer premises. The CSNR is received prior to the CPE being plugged into a network link at the specific customer premises for a first time and includes information describing the specific customer premises and information describing an intended operation to be provided by the CPE for the specific customer. The CPE having been preconfigured to send a provisioning request to a fully qualified domain names (FQDN) unique to the device family and pointed at an IP address of the ZTP server. The provisioning request is sent in response to the CPE being plugged into the network link at the specific customer premises for the first time. CPEs belonging to the same device family are configurable using a shared device profile. The method also includes storing, prior to receiving the provisioning request from the CPE, a job assignment including an identity that is unique to the CPE and service information for the zero touch provisioning of the intended operation of the CPE based on the CSNR. The identity is linked to the specific customer through the job assignment. The method further includes provisioning a class of service (COS) template by selecting and populating at least one device profile defined for the device family with the service information of the job assignment, the COS template exclusively created for providing the intended operation of the CPE at the specific customer premises and paired with the identity of the CPE through at least the job assignment. The method also includes receiving, from the CPE, the provisioning request sent by the CPE to the FQDN in response to the CPE being plugged into the network link for the first time. The provisioning request includes the identity of the CPE. Finally, the method includes pushing, to the CPE, the COS template provisioned using the job assignment matching the identity of the CPE, to configure the CPE for performing the intended operation. The device family is one of a CPE manufacturer and a CPE model.

Particular embodiments may comprise one or more of the following features. The COS template may be provisioned after the provisioning request is received from the CPE. The service information may include information related to service attributes of at least one of a point-to-point protocol (PPP), local area network (LAN) data, a quality of service (QoS), dynamic host configuration protocol (DHCP), virtual local area network (VLAN), virtual private network (VPN) data, transmission system 1 (T1), primary rate interface (PRI) data, SIP trunking, SIP proxy server requests, and multiprotocol label switching (MPLS).

According to another aspect of the disclosure, a system for zero touch provisioning includes a customer premises equipment (CPE) assigned to a specific customer at a specific customer premises, the CPE belonging to a device family. The CPE is communicatively coupled to a network through a network link at the specific customer premises. CPEs belonging to the same device family are configurable using a shared device profile. The system also includes a zero touch provisioning (ZTP) server having a processor and a memory. The ZTP server is configured to receive a customer specification of network requirements (CSNR) exclusively specified for the CPE. The CSNR includes information describing the specific customer premises and information describing an intended operation to be provided by the CPE for the specific customer. The server is also configured to store a job assignment including an identity that is unique to the CPE and service information for the zero touch provisioning of the intended operation of the CPE based on the CSNR. The identity is linked to the specific customer through the job assignment. The server is configured to provision a class of service (COS) template using information originating from the CSNR by selecting and populating at least one device profile defined for the device family with the service information of the job assignment. The COS template is exclusively created for providing the intended operation of the CPE at the specific customer premises and paired with the identity of the CPE through at least the job assignment. The server is further configured to receive, from the CPE, a provisioning request sent by the CPE from the network link at the specific customer premises to a fully qualified domain name (FQDN) unique to the device family and resolving to an IP address of the ZTP server. The provisioning request includes the identity of the CPE. The CSNR is received and the job assignment is stored before the provisioning request is received. Finally, the server is configured to push, to the CPE over the network, the COS template unique to the job assignment matching the identity received in the provisioning request, to configure the CPE for performing the intended operation.

Particular embodiments may comprise one or more of the following features. The device family may be one of a CPE manufacturer and a CPE model. The CPE may be preconfigured to send the provisioning request to the FQDN in response to the CPE being plugged into the network link at the specific customer premises for a first time. The ZTP server may be further configured to determine the device family of the CPE using the provisioning request received from the CPE. The ZTP server may be further configured to determine the device family of the CPE by identifying the FQDN through which the ZTP server receives the provisioning request. The ZTP server may be further configured to determine the device family of the CPE using one of a serial number and a MAC address received in the provisioning request and resolvable to at least the device family of the CPE. The COS template may be provisioned after the provisioning request is received from the CPE. The service information may include information related to service attributes of at least one of a point-to-point protocol (PPP), local area network (LAN) data, a quality of service (QoS), dynamic host configuration protocol (DHCP), virtual local area network (VLAN), virtual private network (VPN) data, transmission system 1 (T1), primary rate interface (PRI) data, SIP trunking, SIP proxy server requests, and multiprotocol label switching (MPLS).

According to yet another aspect of the disclosure, a method for zero touch provisioning, performed by a zero touch provisioning (ZTP) server in a network, includes receiving a customer specification of network requirements (CSNR) exclusively specified for a customer premises equipment (CPE) assigned to a specific customer at a specific customer premises, the CSNR received prior to the receipt of a provisioning signal from the CPE from a network link at the specific customer premises. The CSNR includes information describing the specific customer premises and information describing an intended operation to be provided by the CPE for the specific customer. The method also includes storing, prior to receiving the provisioning request from the CPE, a job assignment including an identity that is unique to the CPE and service information for the zero touch provisioning of the intended operation of the CPE based on the CSNR, the identity being linked to the specific customer through the job assignment. The method further includes provisioning a class of service (COS) template using information originating from the CSNR, the COS template exclusively created for providing the intended operation of the CPE at the specific customer premises and paired with the identity of the CPE through at least the job assignment. The method includes receiving, from the CPE, the provisioning request sent by the CPE from the network link at the specific customer premises to a fully qualified domain names (FQDN) pointed at an IP address of the ZTP server. The provisioning request includes the identity of the CPE. Finally, the method includes pushing, to the CPE, the COS template unique to the job assignment matching the identity of the CPE, to configure the CPE for performing the intended operation.

Particular embodiments may comprise one or more of the following features. The CPE may belong to a device family. The FQDN may be unique to the device family. The provisioning of the COS template may include selecting and populating at least one device profile defined for the device family with the service information of the job assignment. CPEs belonging to the same device family may be configurable using a shared device profile. The device family may be one of a CPE manufacturer and a CPE model. The device family of the CPE may be determined by the ZTP server using the provisioning request received from the CPE. The device family of the CPE may be determined based on the FQDN through which the ZTP server receives the provisioning request. The device family of the CPE may be determined through one of a serial number and a MAC address received in the provisioning request and resolvable to at least the device family of the CPE. The CPE may be preconfigured to send the provisioning request to the FQDN in response to the CPE being plugged into a network link at the specific customer premises for a first time.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
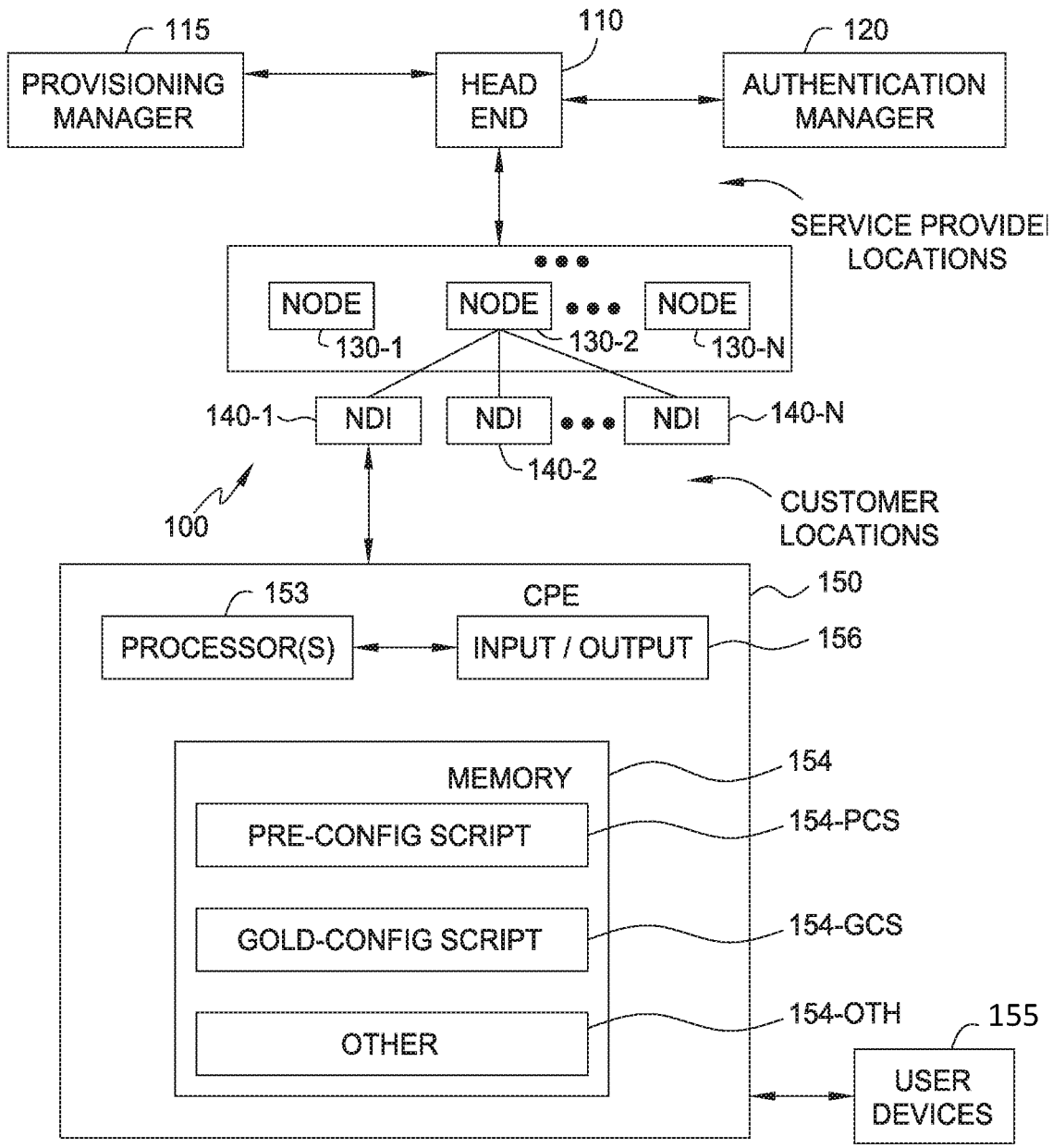
FIG. 1 depicts a high-level block diagram of a system according to one embodiment.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

According to various embodiments described herein, methods, apparatus and software related products (e.g., a computer readable memory or a storage device) are presented for enabling and otherwise providing for the automatic or "zero touch" provisioning of Customer Premises Equipment (CPE). While the invention will be primarily described within the context of automatic provisioning of CPE within a MVPD delivery network, it will be appreciated by those skilled in the art that the teachings of the various embodiments are also applicable to other broadband services delivery networks.

FIG. 1 is a block diagram of a simplified system useful in illustrating the provisioning of Customer Premises Equipment (CPE) according to various embodiments. That is, FIG. 1 depicts a simplified block diagram of a broadband services delivery network benefiting from the various embodiments. Specifically, the broadband services delivery network 100 of FIG. 1 as depicted comprises a MVPD distribution/delivery network, though other types of distribution/delivery networks may benefit from the various embodiments.

The broadband services delivery network 100 comprises, illustratively, a head end 110 adapted to communicate with a provisioning manager or server 115, an authentication manager or server 120 and a plurality of provider edge routers 130-1 through 130-N (collectively provider edge routers 130).

The head end 110 may comprise a cable television head end or network server operative to provide broadband services to subscribers/customers, manage subscriber/customer sessions, propagate content toward subscribers/customers, interact with subscriber/customer CPE and the like. The head end 110 may also provide various session management functions associated with the services instantiated by or on behalf of various subscribers or customers of the service provider. Session management functions generally include sending data to CPE such as commands, encryption keys and the like, receiving data from CPE such as information stream requests, session initiation data (set-top identification, authorization information etc.), user interaction information and the like.

Each of the edge routers 130 is adapted to communicate with a respective group of subscribers/customers via respective CPE located at the subscriber/customer house, office or other location. Subscriber/customer CPE may comprise, illustratively, modems or network interface devices 140, set top boxes (STBs) 150 and other types of CPE such as wireless access points (WAPs) and the like as will be appreciated by those skilled in the art. Further, various user devices 155 may communicate with the service provider network via the CPE, such as wireless or wireline routers (not shown) connected via the modem 140, mobile devices connected via a wireless access point (WAP) in communication with the modem 140 and so on.

FIG. 1 also depicts an illustrative customer location such as a house or business address having a Network Interface Device (NID) or modem communicating with provider network via edge node 130-2, and communicating with CPE 150. CPE 150 is depicted as comprising computing apparatus including one or more processors 153, memory 154 and input/output circuitry 156. The memory is further depicted as including a pre-configuration script 154-PCS, a gold configuration script 154-GCS, and other programming 154-OTH.

The pre-configuration script 154-PCS may be stored in memory 154 at time of CPE manufacturer, or received from local modem 140 in response to powering on CPE 150 for the first time while connected to local modem 140. Generally speaking, the pre-configuration script 154-PCS is invoked at initial power up (or CPE refresh) to provide thereby default information such as enabling the CPE to automatically interact with a remote Zero Touch Provisioning (ZTP) entity (e.g., provisioning manager or server 115) to request CPE configuration and service provisioning information therefrom, such as by automatically transmitting CPE identification information to one or more stored ZTP server addresses. The gold-configuration script 154-GCS comprises CPE configuration and service provisioning information received from the ZTP entity, such as provided by a class of service (COS) template specifically designed to provision the CPE 150 in accordance with the premises-specific environment of the network and the customer specific services to be provided via the network 100. The various scripts and other programming will be described more detail below.

Referring to FIG. 1, provider edge router 130-2 is depicted as communicating with a group of network interface devices (NIDs) 140-1 through 140-N (collectively network interface devices 140). However, in various embodiments where the NID 140 is not necessary to connect the node 130 and subscriber/customer CPE, the node 130 and subscriber/customer CPE is connected directly to the communications network via some other link or interface mechanism.

The authentication manager or server 120 comprises a management entity adapted to implement various CPE authorization mechanisms to ensure that CPE accessing the provider network are authorized to do so. The authentication manager 120 may be implemented as a standalone entity interacting with CPE via the head end 110, via the edge router 130 or via some other network entity in direct or indirect communication with CPE to be authorized. In various embodiments, the authentication manager 120 is included as a module or element within the head end 110 and/or edge router 130. The authentication manager 120 may be implemented within, or interact with, one or more of the edge router 130 to provide a CPE authorization mechanism for respective groups of subscribers/customers.

The provisioning manager 115 comprises a management entity adapted to implement various CPE provisioning mechanisms to ensure that newly installed, updated or refreshed CPE, as well as any other network elements supporting CPE access to the network and network services, are appropriately provisioned to enable CPE access to the provider network and to the relevant services associated with the CPE. Various operations associated with the provisioning manager 115 will be described in more detail below with respect to FIGS. 2-3.

The provisioning manager 115 may be implemented as a standalone entity or server interacting with CPE via the head end 110, via the edge router 130 or via some other network entity in direct or indirect communication with a CPE to be provisioned. In various embodiments, the provisioning manager 115 is included as a module or element within the head end 110 and/or edge router 130. The provisioning manager 115 may be implemented within, or interact with, one or more of the edge router 130 to provide a CPE provisioning mechanism for respective groups of subscriber/customer CPE. In the context of the present description, this automated CPE provisioning mechanism may be referred to as Zero Touch Provisioning (ZTP) because, according to various embodiments, field installation/service personnel are typically not needed to install CPE at customer locations. Accordingly, the provisioning manager 115 may also be referred to as a provisioning server 115 or a ZTP server 115, in the various embodiments disclosed below.

Zero touch provisioning of CPE provides a number of advantages over traditional methods and procedures for installing new CPE at a customer location, or reconfiguring CPE already present at the location. Traditionally, such an installation may require the time and cost of having one or more service provider technicians, and possibly also one or more technicians from the hardware vendor, who manually connect to the CPE to tie into the service provider's network and establish contact with a network operations center, who can push down equipment configurations. This can be a slow and expensive process.

Advantageously, the use of the ZTP systems and methods contemplated herein allow such an installation to be performed by the customer or their agents, often by simply plugging in a new CPE device that was shipped to the customer location, or configuring a CPE to contact a FQDN provided by the service provider. ZTP configuration of the CPE is both faster and less expensive than conventional methods, which may benefit both the customer as well as allow smaller service providers to compete with the larger, well established corporations. This leveling of the playing field may facilitate disruptive innovation within an industry that has been dominated by a few large corporations who sometimes profit more from maintaining the status quo.

It is noted that the various elements described herein with respect to the service provider entities as well as customer entities may be implemented using computing apparatus such as described below with respect to FIG. 4. That is, the various elements such as the head end 110, authentication manager 120, provisioning manager 115, edge routers 130, network interface devices or modems 140, and/or customer premises equipment 150 may be implemented in whole or in part using computing apparatus such as described below with respect to FIG. 4, and as known in the art.

Generally speaking, CPE provisioning comprises configuring the CPE itself as well as configuring various services, protocols, function and the like as needed to support the services to be used by the CPE. These services and service attributes may include, but are not limited to, a Dynamic Host Configuration Protocol (DHCP) pool of addresses that the CPE should use, particular public and/or private Internet Protocol (IP) address(es) to be used by the CPE, a Virtual Local Area Network (VLAN) to which the CPE should belong, the Quality of Service (QoS) parameters associated with the relevant services, a Virtual Private Network (VPN), Transmission system 1 (T1) data, Primary Rate Interface (PRI) data, Multiprotocol Label Switching (MPLS), SIP trunking, SIP proxy server requests, and the like. These parameters must be configured in accordance with the customer's specific network environment.

Further, after initial authentication of CPE to the provider network, additional provisioning steps may be required. For example, in some embodiments, identifying the CPE Media Access Control (MAC) address may occur after the initial authentication. In other embodiments, identifying the CPE MAC address may be performed before the CPE is fully authenticated, as will be discussed in greater detail with respect to FIGS. 5 and 6, below. Various embodiments contemplate authentication of the CPE after provisioning of the CPE 150 via the ZTP server 115.

Various embodiments contemplate providing to each CPE to be configured a pre-configured script as part of a CPE discovery agent instantiated within the CPE when powered up. The pre-configured script may comprise a standard of "gold" script included within the CPE during manufacture or included within the CPE prior to sending the CPE to a customer location for installation.

Various embodiments contemplate that CPE 150 such as a router includes an Ethernet interface and a preconfiguration script 154-PCS with DHCP IP enabled so that the CPE 150 calls out for a dynamic IP address via the modem 150 (e.g., CPE 150 connected to MTA Ethernet output of modem 140) when first plugged in.

Various embodiments contemplate providing to each CPE to be configured a respective configuration template as part of a CPE-deployed agent instantiated within the CPE after power up, such as after an initial discovery process has been performed (e.g., according to the discovery agent pre-configuration script, etc.). The respective configuration template, in some embodiments referred to as a class of service (COS) template, may be sent by the provisioning manager 115 to the CPE 150 as a file using file transfer protocol (ftp), as a network message or via some other format or delivery mechanism (e.g. HTTP, HTTPS, etc.).

Various provider equipment or entities cooperate to implement the CPE provisioning mechanisms of the various embodiments. For example, in one embodiment the following entities perform the following functions to implement thereby a system or mechanism for receiving and distributing to CPE templates that configure/provision the CPE in an appropriate manner. In this example, it is assumed that CPE is to be delivered to a customer's location where the customer will simply connect the power and network cables and power up the modem and CPE, which will then be configured and provisioned automatically.

Figure 2:
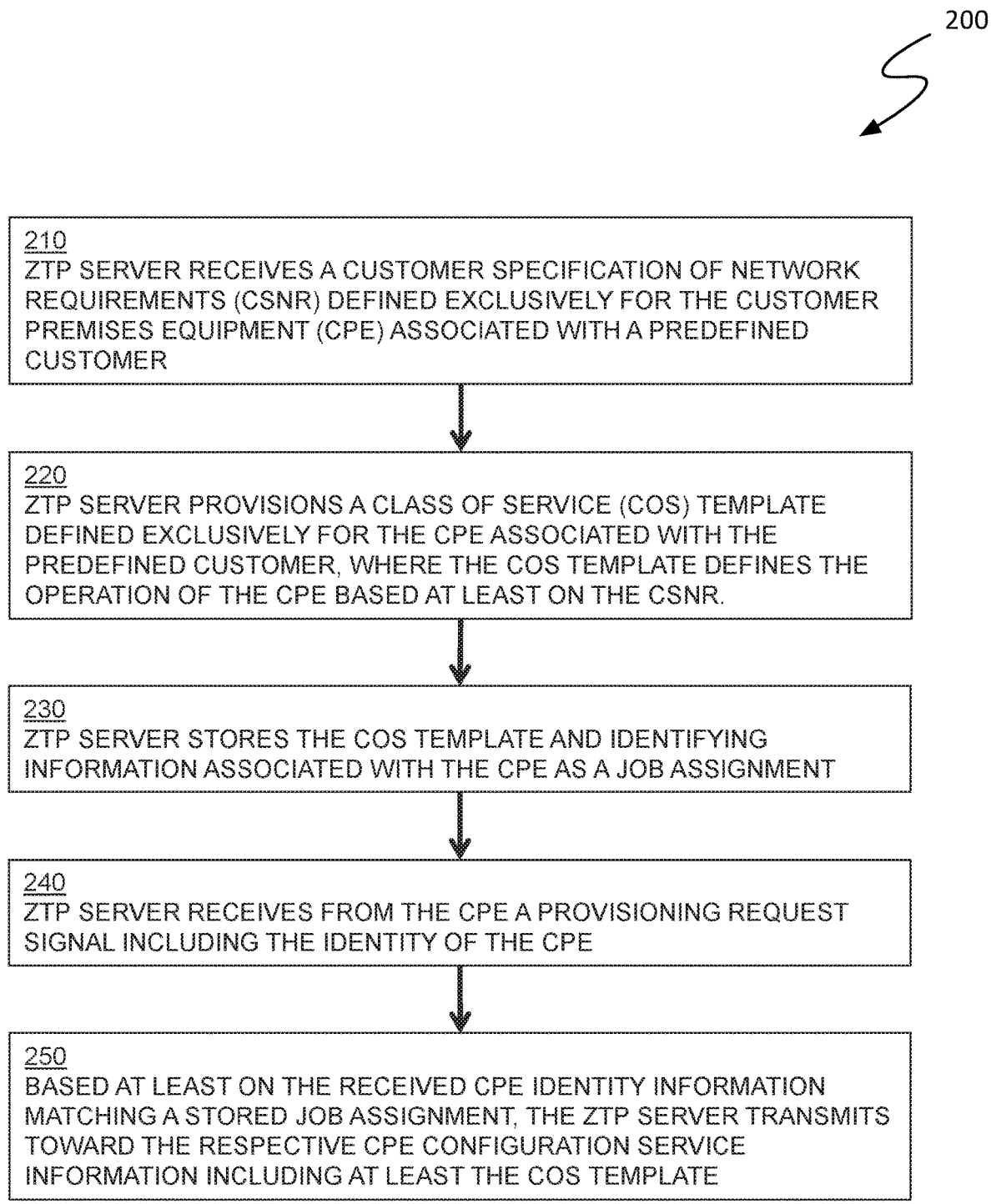
FIGS. 2 and 3 depict a flow diagrams of methods according to various embodiments.

FIG. 2 depicts a method 200 for staging and deploying class of service (COS) templates suitable for use in a ZTP server, such as the provisioning manager 115 discussed above with respect to FIG. 1.

At step 210, the ZTP server 115 receives a customer specification of network requirements (CSNR) defined exclusively for the customer premises equipment (CPE) associated with a predefined customer. For example, a CSNR may be specified for a CPE device to be delivered to a customer home or business, such as a set-top box (STB), a CPE router, a CPE switch, a voice over Internet protocol (VoIP) device or other other CPE device. The location of the customer home or business (i.e., the customer location) is known, the network topology associated with the neighborhood is known, the initial services to be provided to the customer is known. According to various embodiments, the CSNR may specify the customer location (e.g. public IP address, mailing address, coordinates, etc.), network topology, initial services to be provided to the customer, and the like. In some embodiments, a CSNR may specify all of the services to be provided to the customer at the customer location, possibly requiring the provisioning of multiple CPE. In other embodiments, a CSNR may be defined for each CPE to be provisioned.

At step 220, the ZTP server provisions a class of service (COS) template defined exclusively for a CPE associated with the predefined customer, where the COS template defines the operation of the CPE and is based at least on the CSNR. In various embodiments, the class of service (COS) template comprises service configuration layer information, such as information indicating at least one of voice quality and a voice session initiation protocol (SIP) trunking.

At step 230, the ZTP server stores the COS template and identifying information associated with the CPE as a job assignment. In various embodiments, the job assignment comprises one of a plurality of job assignment entries in a table of job assignments for a corresponding plurality of CPEs. The table may be stored in the ZTP server or some other management entity.

At step 240, the ZTP server receives from the CPE a provisioning request signal including the identity of the CPE upon the CPE being plugged into a network link at the customer premises for the first time. In various other embodiments, the CPE signal including the identity of the CPE may be transmitted by the CPE in response to a remotely generated refresh signal, a locally generated refresh signal and the like.

In various embodiments, the identity of the CPE is based upon a manufacturer serial number or other serial number associated with the CPE. In various embodiments, the ZTP server is identified by an auto link within the CPE upon CPE power up the first time (or refresh). The auto link may comprise a fully qualified domain name (FQDN) associated with the ZTP server or some other resource locator or identifier. In various embodiments, the CPE may be identified via a Media Access Control (MAC) address.

In various embodiments, a communication path between the ZTP server and the CPE includes a modem or network link installed in the customer premises at configured to communicate with an access network of the service provider.

At step 250, based at least on the received CPE identity information matching a stored job assignment, the ZTP server transmits toward the respective CPE service information including at least the COS template information associated with the stored job assignment.

In various embodiments, the COS template information is not transmitted toward the respective CPE until the respective CPE is authenticated. Examples of service attribute information transmitted toward the CPE include, but are not limited to, point-to-point protocol (PPP) information, local area network (LAN) information, Quality of Service (QoS) information, Dynamic Host Configuration Protocol (DHCP) information, Virtual Local Area Network (VLAN) information, Virtual Private Network (VPN) information, Transmission System 1 (T1) information, Primary Rate Interface (PRI) information, Multiprotocol Label Switching (MPLS) information, SIP trunking, SIP proxy server requests, firewall Access Control Lists (ACL), and the like.

Figure 3:
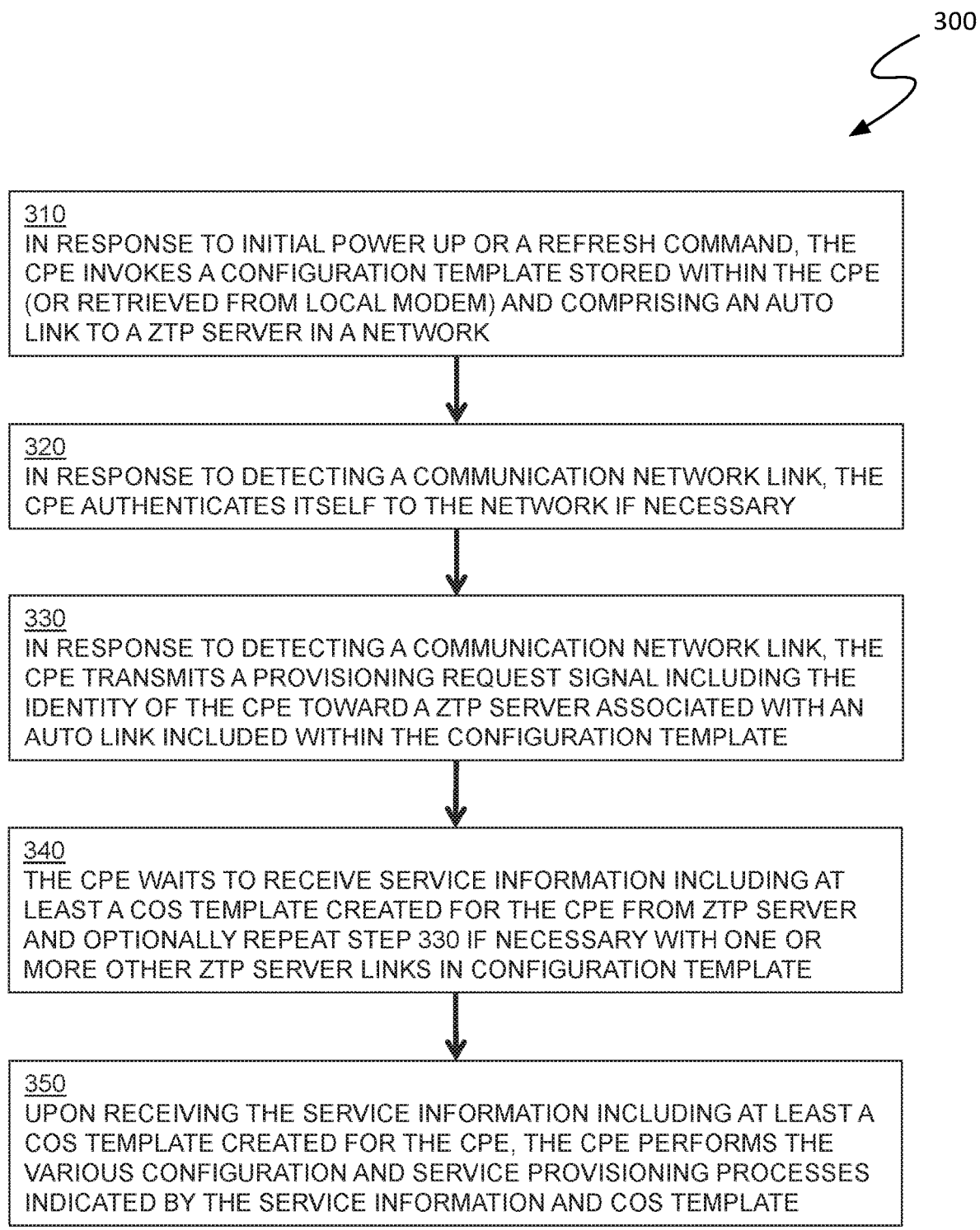

FIG. 3 depicts a method 300 for zero touch provisioning invoked at a CPE to retrieve and implement configuration and service information such as provided via a COS template requested by the CPE and received from the ZTP upon CPE initial power up or refresh.

At step 310, in response to initial power up or a refresh command, the CPE invokes a configuration template stored within the CPE and comprising an auto link to a ZTP server in a network. According to various embodiments, the auto link points to a FQDN that resolves to the ZTP server. In various embodiments, the configuration template is included within the CPE by the manufacturer of the CPE. In various embodiments, the configuration template is communicated to the CPE by a modem or other device associated with the service provider and local to the CPE. That is, the CPE may receive an initial configuration template or a replacement configuration template from a modem at the customer location.

At step 320, in response to detecting the presence of a communication network link, the CPE authenticates itself to the network, if necessary. For example, if the CPE is connected and powered on for the first time at a customer location, prior to receiving network services above the minimum necessary to provide authentication, the CPE must be authenticated as authorized for receiving such network services. Generally speaking, the CPE will communicate identification information such as an identification number (e.g. manufacturer serial number, etc.), MAC address, and the like, to an authentication manager such as authentication manager 120. If the authentication manager determines that the CPE is authorized to access network services, then the authentication manager will communicate such authorization/authentication to other management entities such as head end 110, provisioning manager 115, and the like.

Various embodiments contemplate authentication of the CPE after the provisioning of the CPE via the ZTP server. In these embodiments, the functions of step 320 may instead be performed after some or all of the following steps have been completed.

At step 330, in response to detecting the presence of a communication network link, the CPE transmits a provisioning request signal including the identity of the CPE toward a ZTP server associated with an auto link included within the configuration template. The auto link comprises an IP address or Uniform Resource Locator (URL) associated with a ZTP server. In various embodiments, the auto link to the ZTP server comprises a fully qualified domain name (FQDN) of the ZTP server or, in some embodiments, a hostname or account through a FQDN service that resolves to a customer or hardware specific aspect of the ZTP server.

In various embodiments, the communication network link between the communication network and the CPE may be provided in any standard manner such as via a coaxial cable, a twisted pair, an optical fiber a network cable (e.g., ETHERNET), and the like. The communication network link may be directly connected to the communication network, or connected via a modem at the customer location.

At step 340, the CPE waits to receive service information including at least a COS template created for the CPE from the ZTP server. Optionally, in various embodiments multiple links to ZTP servers are provided within the configuration template to enable the CPE to transmit a provisioning request signal to one or more other ZTP servers if needed (e.g., initial or subsequent ZTP server does not respond within a predefined time period). That is, in various embodiments step 330 may be repeated as necessary if an initial or subsequent ZTP server is not reachable by the CPE.

At step 350, upon receiving the service information including at least a COS template created for the CPE, the CPE performs the various configuration and service provisioning processes indicated by the service information and COS template such that the CPE is properly configured for operation with the service provider network and properly configured for delivering the appropriate network services to the customer.

Thus, the method 300 provides a mechanism which a CPE requests and receives service information (including at least a COS template) which was generated specifically for that customer CPE device in accordance with a customer specification of network requirements (CSNR). In this manner, the customer only needs to plug the CPE into the local modem and the CPE will configure itself and those services appropriate to the customer.

In various embodiments, the provisioning manager or server 115 or ZTP server stages pre-provisioned Class of Service (COS) templates that may be allocated to assigned CPE serial numbers associated with specific customers, or may comprise default COS templates for use in the absence of customer-specific COS templates. In some embodiments, the staging of COS templates is performed prior to the scheduled delivery/installation day associated with the customer CPE, such as hours (same day COS template generation/association), days or weeks ahead of CPE delivery to customers. In other embodiments, a COS template may be provisioned after a provisioning request has been sent by a CPE, which will be discussed further with respect to FIGS. 5 and 6, below.

Staging comprises determining configuration and provisioning information associated with both the local CPE environment and the local CPE customer services to be delivered. To do this, the serial number or other unique identifier of the CPE to be delivered to an individual customer is identified such that the CPE identifier may be associated with that customer through a job assignment. COS templates associated with CPE serial numbers are configured to support the various functions required of the CPE when configured to support respective customer requirements and services.

In various embodiments, the provisioning manager or server 115 considers each such CPE-to-customer association, as well as the respective COS template, to be one job within a batch of jobs assigned. Each job is stored in a claim table or database by the ZTP server.

In some embodiments, a new device claim table is used by the ZTP server to push an initial or bootstrap configuration to the CPE. The initial configuration enables the CPE to find and interact with the ZTP server upon CPE power up at the customer location. The bootstrap configuration may be pushed to the CPE at a time of CPE manufacture, at a time of testing CPEs received from the manufacturer, at a time of testing CPEs prior to deployment or customer delivery, or at an initial CPE power up time (if stored local and available to the CPE, such as within a modem at the customer premises). The initial configuration provides various service attributes such as those for setting up VLAN, PPP, LAN Data/Voice DHCP, COS, QoS, as well as further complex network configurations as discussed herein.

The CPE plug and play utilizes, in one embodiment, FQDN auto-links and DHCP options pre-written and flashed to CPE configurations tables with what is denoted herein as a "Gold Configuration" such as at the point that CPE inventory reaches a distributor. This enables prompt handoff of the CPE within a warehouse environment for CPE pickup or package shipments.

At a customer location, after connection of power and network cabling, the CPE is powered up. At this point, the CPE finds home base (e.g., via FQDN and DHCP-Gateway Options) and, once a live loop is plugged into the CPE Ethernet port, the AG router IP redirector sends traffic destined for the service provider's DHCP scope, ZTP domain, hosted within DMZ for secure DHCP IP assignment and authentication to ZTP Server for push of bootstrap template configuration.

Authentication may be performed before or after CPE configuration via the configuration file and interaction with the CDP domain. Once IP authentication of the ZTP agent (CPE/IAD) has initialized through the Transport & AR IP Edge (via VLAN Specific/DMZ tunneling), to DHCP's IP Controller for IP assignments (Utilizing Options 43 & 60—Vendor Specific Identifier); authenticating CPE's entry into the ISP (Internet Service Provider) network, where DNS will direct CPE to ZTP Server's—FQDN residence (ztp-cpe.isp.com). Thus, enabling a secure registration within our DMZ and ZTP Server's new device claim table, which will then prompt for automatic template push of bootstrap configuration files, firmware updates, as well as any further routing tables or protocols required.

The various embodiments described above generally provide a mechanism in which a standard router, switch or other CPE may be associated with specific "golden configuration file" designed to enable that specific CPE to properly configure itself to its intended customer premises network environment, and properly configure itself to the services appropriate to its intended customer.

In various embodiments, a Fully Qualified Domain Name (FQDN) included within a pre-configuration file is used by the CPE wherever it may be deployed. Based on the FQDN, the Domain Name Server (DNS) knows to point the domain name to a specific location. Thus, once the CPE powers up, it knows where it resides within a network. Further, based on the MAC address of the CPE, the network service provider knows the class of services associated with the customer and can push down to the CPE the necessary configuration information as part of the golden configuration file.

Advantageously, these various mechanisms enable a company deploying CPE to have the CPE tested remotely up to some demarcation point, such as an Ethernet connection that plugs into the CPE. In some embodiments, the remote testing may also detect and facilitate resolution of problems or misconfigurations downstream from the CPE (e.g. past the Ethernet connection of the CPE, etc.). If such testing indicates that the CPE is not functioning or at least not reachable, then a new CPE may be shipped to the customer directly rather than sending a technician to diagnose/repair/replace. The customer merely unplugs the old CPE and replaces it with the new CPE. The configuration processes described herein proceed to provision the replacement CPE rapidly and correctly.

Similarly, if the MAC address of an old CPE device to be replaced is known, then a "snapshot" of the configuration parameters associated with that CPE device may be captured and used to populate similar configurations of a replacement CPE device. This configuration snapshot may be performed for every CPE device within a system upon successful provisioning/configuration of that device. This information may be stored in a database associated with the provisioning manager or server 115, head end 110 or some other network entity. Thus, prior to shipping replacement CPE out to a customer, the configuration associate of the old CPE is staged as described above with respect to FIG. 2 such that upon the new CPE pairing up, the appropriate configuration information is provided thereto.

Pre-staging of templates with old images of CPE waiting to be called out by new CPE provides improvements in customer service response times while reducing on-site technician calls. CPE images may comprise pre-provisioning information (e.g., default configuration templates), post-provisioning information (e.g., staged configuration templates or COS templates), existing MAC addresses, MAC addresses of CPE to be shipped and so on.

In various embodiments, a replacement CPE may be automatically be updated with configuration and service provisioning information associated with a failed CPE at a customer location. For example, in one embodiment where the MAC address of the new and old CPE is known, the replacement CPE is provided with the configuration and service provisioning information originally generated for the failed CPE at the customer location. Thus, when the replacement CPE is initially powered on at the customer location, if the ZTP server determines that a provisioning request is received from a replacement CPE, the ZTP server will transmit the same service information to the replacement CPE initially generated for use by the failed CPE.

Figure 4:
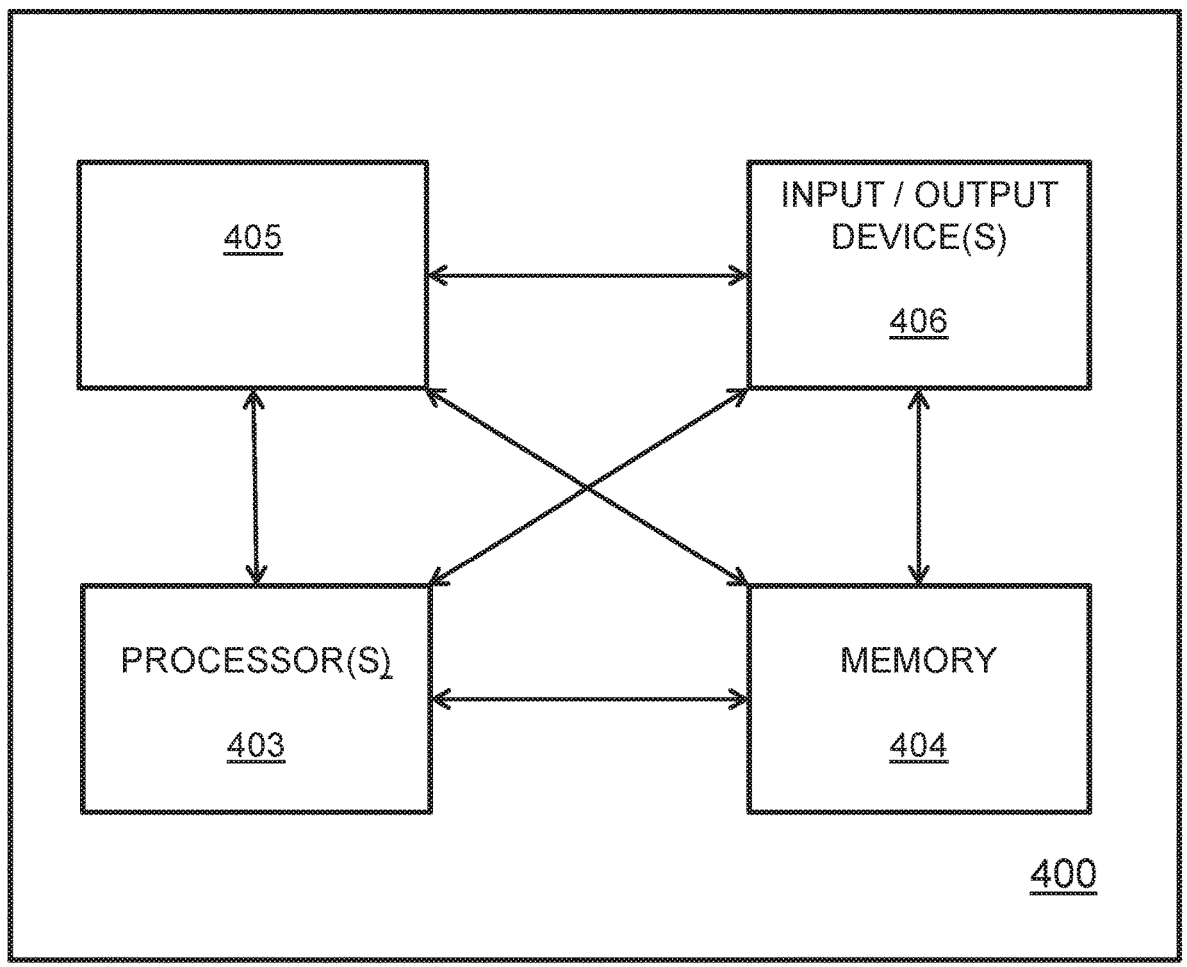
FIG. 4 depicts a high-level block diagram of a computer suitable for use in performing the functions described herein.

FIG. 4 depicts a high-level block diagram of a computing device 400 suitable for use in performing various functions described herein with respect to the disclosed embodiments, such for implementing any device like device IO as described above with respect to the various figures. FIG. 4 is a simplified block diagram of a computing/electronic device that is suitable for practicing the exemplary embodiments of this invention, and a specific manner in which components of the device are configured to cause that device to operate.

As depicted in FIG. 4, computer (computing device) 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a solid state drive, a hard disk drive, an optical drive and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 402 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device, such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

As discussed above, conventional methods for provisioning CPE units are often expensive and slow. In a scenario that may be preferable for a network service provider, a customer may be requesting the provisioning of new services using new CPE units sourced from the network service provider. The network service provider will have a preferred set of equipment that their field technicians and back office personnel are adept at installing and configuring. However, even in such a scenario, the customer must wait for, and pay for, one or more field technicians to be on-site to begin a multi-step provisioning process for each CPE unit.

As a specific example of the conventional provisioning method, a field technician plugs into the CPE unit, opens a console, and prepares the CPE to make contact and receive instructions. This preparation may include enabling interfaces and hardcoding a particular IP assigned to the CPE within the customer's network. The technician then makes contact with a "test and turn up" team, or a network operations center (NOC), to let them know that device is ready for configuration. In some cases, this process may be repeated for each CPE unit. It is not uncommon for a customer's intended operation to require numerous CPEs. Even an ideal provisioning scenario, with a customer ordering all new CPE units that are well understood by the service provider's install team, can be slow and expensive using traditional methods.

However, in many cases, the circumstances of provisioning new or modified network services are less than ideal for the network service provider and the customer. For example, customers may have already invested in a collection of CPE units, and do not want the expense of replacing all of those units with hardware that is preferred by a new service provider. As a consequence, sometimes the service provider's field technicians are tasked with provisioning CPE units that they are unfamiliar with, requiring the assistance of technicians from the original CPE vendor, further increasing cost and the length of the install. There is a wide range of CPE equipment available, providing a wide range of capabilities and having a wide range of provisioning procedures and limitations.

Contemplated herein is a system and method for agnostic zero touch provisioning of CPE units. These systems and methods are almost identical to those discussed above, and in many cases operate in exactly the same way. However, according to various embodiments, an agnostic ZTP system is able to automatically provision CPEs from a wide range of hardware manufacturers, having different provisioning procedures and configuration formats. The system does this by identifying a device family that the CPE unit belongs to, and then stages the COS template by populating a device profile specific to that device family, using data derived from the CSNR. The system is effectively agnostic to what hardware is being configured; so long as the information needed to provision the desired services and an appropriate device profile are known, the ZTP server can get the CPE up and running at the customer location without requiring human intervention, according to various embodiments.

The agnostic nature of the systems and methods contemplated herein advantageously allows a service provider to work with a preferred set of hardware as well as any other hardware (e.g. CPE units already owned by the customer, etc.) at roughly the same expense, in both time and resources. The agnostic ZTP system is also adept at being quickly configured to work with a new set of hardware, as it only requires the definition of one or more device profiles. Once the device profiles have been defined, they can be used over and over to provision CPEs for multiple customers at multiple locations.

Figure 5:
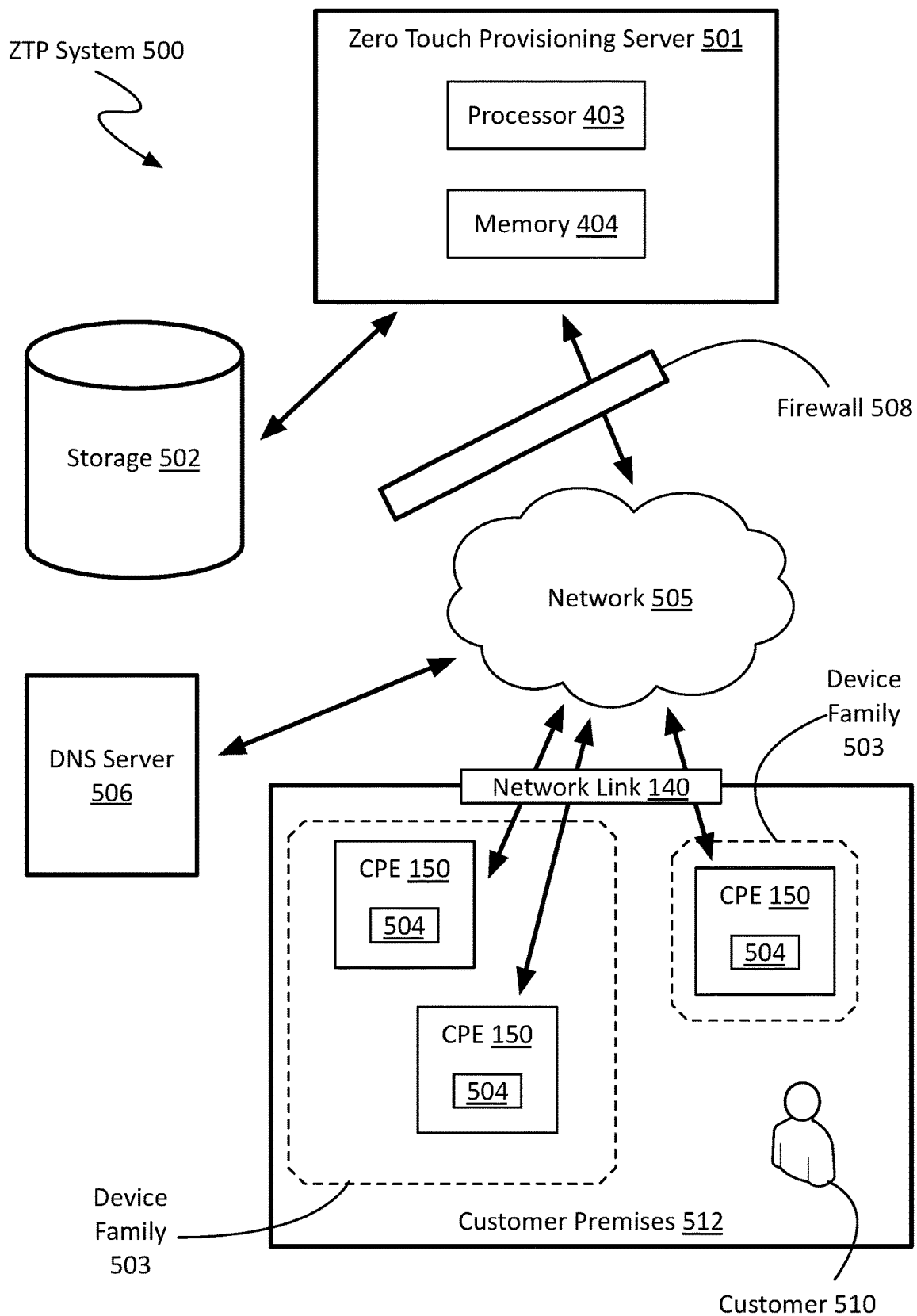
FIG. 5 is a schematic view of an agnostic zero touch provisioning (ZTP) system.

FIG. 5 is a schematic view of a non-limiting example of an agnostic zero touch provisioning (ZTP) system 500. It should be noted that FIG. 5 shows the system 500 comprising a ZTP server 501 seemingly isolated, in contrast to the exemplary system shown in FIG. 1, where the or provisioning manager 115 (or ZTP server 115) is communicatively coupled to a head end 110 and an authentication manager 120. The head end 110, authentication manager 120, and other elements shown in the non-limiting example of a ZTP system in FIG. 1 have been omitted from FIG. 5, for clarity. In some embodiments, the ZTP server 501 shown in FIG. 5 may be implemented in an environment similar or identical to the environment shown in FIG. 1 and discussed above.

In other embodiments, the ZTP server 501 may be implemented separately. For example, in one embodiment, the ZTP server 501 may be added to a preexisting system, such as a CPE management system that a network service provider has invested in and made use of. In such an embodiment, the ZTP server 501 may be used for the initial provisioning of the CPEs (e.g. CPEs configured to contact FQDN that leads directly to the ZTP server 501, etc.), and said provisioning will include any configuration necessary to ensure the provisioned CPEs look to the legacy management system for future instruction. In other embodiments, the ZTP server 501 may also comprise a management functionality that may be used to provide additional instructions or push out new profiles to CPE units that have already been provisioned by the system. In still other embodiments, the ZTP server 501 may embody some or all of the functionality provided by other elements such as the head end 110 and/or authentication manager 120, as discussed above with respect to the provisioning manager 115.

As shown, the ZTP server 501 comprises a processor 403 and a memory 404. It should be noted that the configuration manager 115 discussed above is able to accomplish the same tasks as the ZTP server 501, according to various embodiments. The difference between these two embodiments of a zero touch provisioning server is that the ZTP server 501 discussed below is able to deal with various CPE units having different proprietary methods of configuration (e.g. file formats, required information, procedures, etc.) with less effort on the part of the network service provider, or whatever entity is doing the provisioning.

According to various embodiments, the ZTP server 501 is able to deal with a heterogeneous collection of CPE units using an integration layer. The integration layer is responsible for the collection of a plurality of device profiles that may be used for configuring various CPE 150 units. In the context of the present description and the claims that follow, a device profile is a framework that defines a format for configuration instructions for a particular service or intended use for a particular family of CPE hardware. Device families and device profiles will be discussed in greater detail, below.

In some embodiments, the integration layer gathers and organizes a plurality of device profiles. In other embodiments, the integration layer may also create device profiles, by extrapolating the structure of a configuration template from provided examples, include open source examples.

Device profiles are defined for device families. In the context of the present description and the claims that follow, a device family is a collection of CPE units 150 that are able to receive and execute configuration instructions having the same format. In other words, if it is known how to format a configuration script of COS template for one member of a device family 503, then it is known how to do so for every member of that device family 503. Every CPE 150 belongs to at least one device family 503. As shown, the non-limiting example of a customer premises 512 of FIG. 5 makes use of three CPE units 150, two belonging to one device family 503, and the other belonging to a different device family 503. It should be noted that device family 503 is only dictated by the procedures and formats involved with the configuration of the hardware; although the three CPE 150 shown in FIG. 5 belong to two different device families 503, they are not necessarily incompatible after being provisioned for their intended usage.

In some embodiments, device family 503 may be defined in terms of the make and model of a CPE 150. For example, many CPE manufacturers have developed proprietary methods and formats for configuring their CPE hardware which may vary from maker to maker. Additionally, over time configuration methods evolve and improve, so additional distinctions may be drawn between models or product lines. In other embodiments, device families 503 may be defined in some other way that goes beyond the boundaries of make and model. For example, in one embodiment, one device family 503 may be composed of CPE units 150 that are all compatible with a standardized or open source format for a configuration file.

According to various embodiments, a plurality of device profiles may be defined before the ZTP server 501 provisions any CPE 150. Over time, more device profiles may be added to the ZTP server 501, to expand its ability to provision CPE units 150.

As shown, the ZTP server 501 is communicatively coupled to a storage 502. In some embodiments, the storage 502 may be external to, and communicatively coupled with, the ZTP server 501. In other embodiments, the storage 502 may be incorporated into the server 501, and in still other embodiments, the storage 501 may be remote to the server 501, and coupled over the network 505 (e.g. cloud storage, etc.). In some embodiments, the storage 502 may be a database, while in other embodiments the storage 502 may be a file system. Those skilled in the art will recognize that the systems and methods contemplated herein may be adapted to any of the numerous digital storage technologies and methods available, now and in the future.

According to various embodiments, the storage 502 may be used to store jobs, COS templates, CSNR, device profiles, and the like. It should be noted that much, if not all, of that information could be stored in text files. In some embodiments, each of those data objects may be a separate file, while in other embodiments, some those data objects may be combined into a single file. In the context of the present description and the claims that follow, each of those data objects will be assumed to hold information for at least one customer, CPE device, location, and/or service, but the inclusion of multiple subjects is not precluded.

In some embodiments, the storage 502 may be structured to represent the different device families 503. For example, in one embodiment making use of a file system, the device profiles may be stored in a directory structure that branches from manufacturer to model or product line. As a specific example, in one embodiment, the device profiles for a CPE, model 5600, made by Sequoia, may be stored along a path "dir/sequoia/device-profile/model5600". Within that directory may be a collection of device profiles that can be used by a Sequoia model 5600 CPE (once the device profile is populated) to provision any number of services. Of course, in other embodiments, a similar branching structure may be implemented in a database environment.

In some embodiments, device families 503 may be delineated based on shared instruction sets and functionalities. Of course, in all cases, a device family 503 is defined by the ability to share configuration methods and formats. But while some embodiments may store device profiles in terms of manufacturer and model, for example, others may store the device profiles using an organization based on other commonalities.

According to various embodiments, device profiles may be provided by hardware manufactures, open source projects, and the like. In some cases, the device profiles may be reverse engineered from proprietary configuration scripts and data structures that otherwise would not be available.

In some embodiments, a single device profile may comprise a configuration template for provisioning multiple services for a device family 503. In other embodiments, a separate device profile may be defined for each service that could be provisioned. In some of these embodiments, a job entry could contain the information specific to a customer and location, and simply point to the device profile for the appropriate device family and desired service(s). The population of device profiles will be discussed in greater detail with respect to FIG. 6, below.

In some embodiments, COS templates may be staged/provisioned and stored before a provisioning request is received. These COS templates, which are specific for a certain customer and location, may be stored using the same organization as is used for the device profiles. In other embodiments, the COS templates may be stored in a different manner.

As shown, one or more CPE 150 may be associated with (e.g. owned by, used by, provided by, paid for by, etc.) a specific customer 510, for use at a specific customer premises 512, as discussed above. As shown, each CPE 150 belongs to a device family 503, and comprises an identity 504 that is unique to each CPE 150. Examples of CPE identities 504 include, but are not limited to, serial numbers, MAC addresses, and the like. In some embodiments, the identity 504 of the CPE 150, which is sent as part of a provisioning request (as discussed above), may be used to determine the device family 503 of the CPE 150.

As mentioned above, the ZTP server 501 may be used to provision CPEs 150 provided to the customer 510, as well as CPEs 150 already owned by the customer 510, according to various embodiments. CPEs 150 provided by the network service provider have the advantage of having a known identity 504, and may be preconfigured for provisioning, as discussed above. For example, a CPE 150 may be pre-flashed to have a preconfiguration script that will implement DHCP, obtain an IP address, and send a provisioning request to a FQDN pointing to the ZTP server 501 in response to being plugged into the network link 140 at the customer premises 512 for the first time. If the CPE 150 is already owned by the customer 510, and they wish for it to be provisioned and managed by a new network service provider, they may have to provide the identity 504 of that CPE 150 along with the CSNR. When it is time for provisioning to occur, the customer 510, an agent of the customer 510, or some other person (e.g. field technician, etc.) can manually instruct the CPE to send a provisioning request to an FQDN that resolves to the public IP of the ZTP server 501.

As shown, the ZTP server 501 and the CPE 150 being provisioned are communicatively coupled through a network 505. According to various embodiments, the CPE 150 may send its provisioning request to a FQDN provided by the ZTP server 501 or the network service provider which is resolved by a DNS server 506 to point to a public IP address for the ZTP server 501, as is known in the art. In some embodiments, the FQDN may point to a firewall 508 (or the edge node 130 of FIG. 1) which may then pass the provisioning request along to a private IP address belonging to the ZTP server 501, if certain access policies are satisfied (e.g. ACL list, authentication, CPE identity, etc.).

Figure 6:
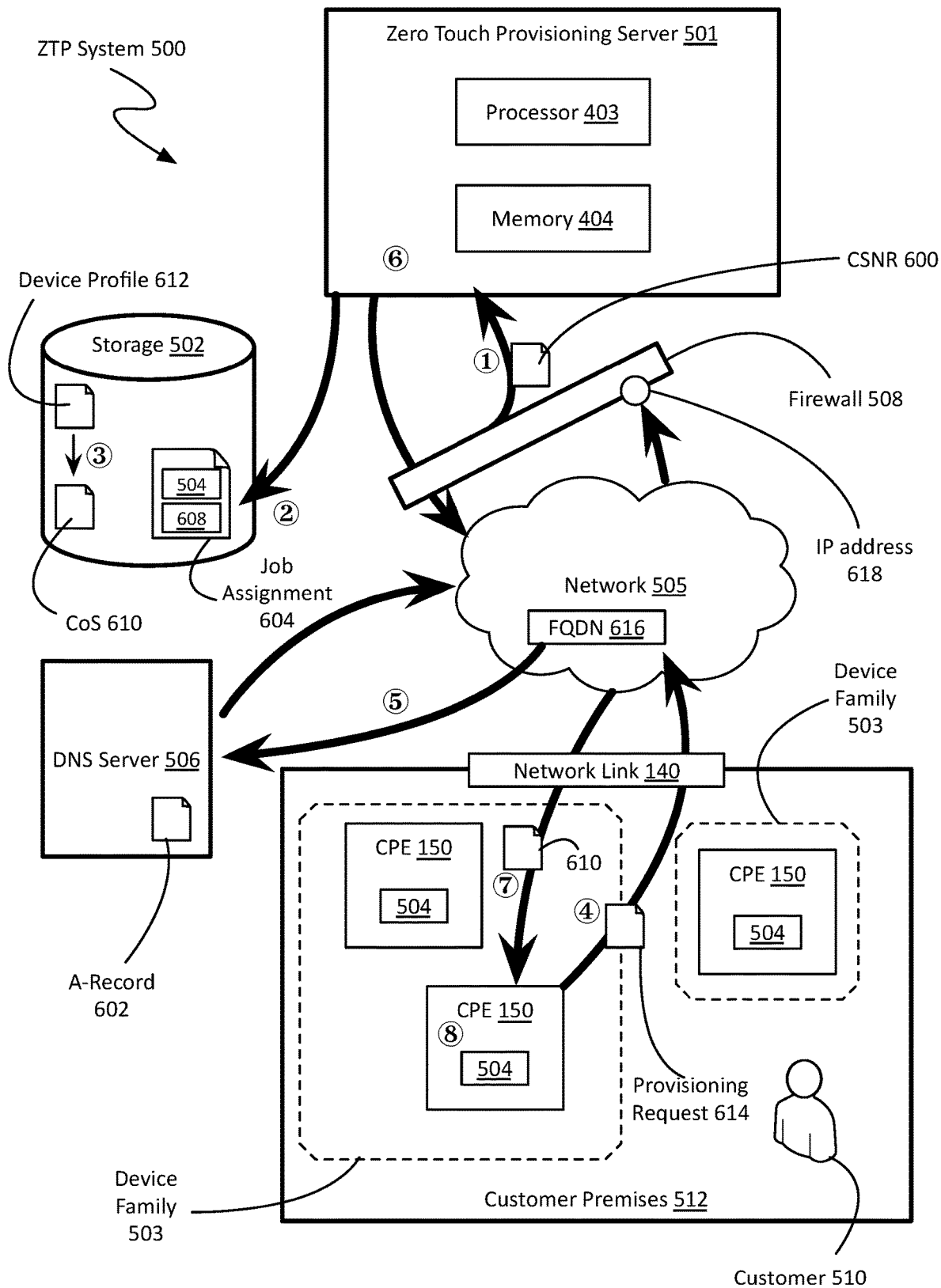
FIG. 6 is a flow view of an agnostic zero touch provisioning method in a ZTP system.

FIG. 6 is a flow view of a non-limiting example of a hardware-agnostic zero touch provisioning method in a ZTP system. Specifically, FIG. 6 is a non-limiting example of the steps taken by a ZTP server 501 in zero-touch provisioning a single CPE 150 at a customer premises 512.

First, a customer specification of network requirements (CSNR) 600 is received by the ZTP server 501. See 'circle 1'. According to various embodiments, the CSNR 600 is exclusively specified for a particular customer premises equipment (CPE) 150 assigned to a specific customer 510 at a specific customer premises 512. As discussed above, the CSNR 600 includes information describing the customer premise 512 (e.g. public IP address, mailing address, hostname, etc.) and information describing an intended operation to be provided by the CPE 150 for the customer 512. In some embodiments, the ZTP server 501 may receive the CSNR 600 as a file prepared on and sent by another machine. In other embodiments, the information making up the CSNR 600 may be input directly into the ZTP server 501 though an interface. Examples of such an interface include, but are not limited to, a web management interface, network management software, input pulled directly from an e-commerce server where customers 510 may place orders for specific network functionality, and the like. In some embodiments, the CSNR 600 may include an identity 504 of a particular CPE 150 (e.g. a CPE 150 already owned by the customer 510 that they wish to have provisioned, etc.).

In some embodiments, a CSNR 600 may specify information and intended operations that require multiple CPE's 150 to implement. In other embodiments, a CSNR 600 may need to be supplied for each CPE 150 that is to be provisioned.

Next, a job assignment 604 is stored by the ZTP server 501. See 'circle 2'. As previously discussed, a job assignment 604 includes an identity 504 of a specific CPE 150 as well as service information 608 needed for the zero-touch provisioning of the intended operation of the CPE 150, based on the CSNR 600. The job assignment 604 serves as a record of the link between a specific CPE 150 (e.g. a CPE 150 that has been shipped to the customer 510 at a specific customer premises 512, a CPE 150 already in the customer's possession that the customer has identified in the CSNR 600, etc.) and a customer 510/customer premises 512, according to various embodiments.

In some embodiments, the job assignment 604 may comprise the COS template 610 that will eventually be pushed to the CPE 150, as discussed above. In other embodiments, the job assignment 604 may point to an already staged COS template 610 that can be pushed to the CPE unit in response to a provisioning request 614. In still other embodiments, the job assignment may simply point to the device profile that will be populated to create a COS template 610. As a specific example, a job assignment 604 may indicate that customer Doggy Daycare at public IP 17.21.8.221 needs a Sequoia model 5600 CPE with serial number 565656 provisioned for SIP trunking, and include the path/dir/sequoia/device-profile/model5600/COS-SIP_trunking, pointing to a device profile for SIP trunking with that type of CPE. The COS template 610 may be staged by populating the device profile(s) pointed to by the job assignment 604, according to various embodiments.

In still other embodiments, the job assignment 604 may contain the service information 608 that will be needed to provision a CPE 150 for the customers intended operation, but a COS template 610 is not staged until the CPE 150 makes first contact and the device family 503 is determined. Upon determining the device family 503 of the CPE 150, a device profile 612 can be used to stage the COS template 610.

As previously discussed, the job assignment 604 includes service information 608 needed to provision the CPE 150. Examples of service information 608 include, but are not limited to, service attributes for point-to-point protocol (PPP), local area network (LAN) data, a quality of service (QoS) data, dynamic host configuration protocol (DHCP) data, virtual local area network (VLAN) parameters, virtual private network (VPN) data, transmission system 1 (T1) parameters, primary rate interface (PRI) data, SIP trunking, SIP proxy server requests, and multiprotocol label switching (MPLS) structures and data. Other information that may be specified in a job assignment 604 includes, but is not limited to, ACLs, interfaces that need to be enabled, credentials (e.g. usernames and passwords, etc.), specific public and/or IP addresses for that CPE to use, private network topology, and the like.

Next, a Class of Service (COS) template 610 is staged. See 'circle 3'. As previously discussed, the COS template 610 is what gets pushed to the CPE 150 so that it can configure itself for its intended use. The COS template 610 is exclusively created for provisioning a particular CPE 150 to perform certain operations at the specific customer premises 512. In some embodiments, the COS template 610 may be provisioned at roughly the same time as the job assignment 604, or immediately before or after. In other embodiments, the COS template 610 may be provisioned after the associated provisioning request 614 has been received from the CPE 150 and the device family 503 has been determined, as previously discussed. The COS template 610 is provisioned by populating one or more device profiles 612 using information based on the CSNR 600 and at least referenced by the job assignment 604, according to some embodiments.

Next, a provisioning request 614 is sent by the CPE 150 to a fully qualified domain names (FQDN) 616. See 'circle 4'. In some cases, the CPE 150 being provisioned was provided by the network service provider, and has been flashed with a preconfiguration script before being shipped from the manufacturer or network service provider. The preconfiguration script, according to various embodiments, causes the CPE 150 to obtain an IP number using DHCP upon being connected to a network link 140 at the customer premises 512 for the first time, and then sending a provisioning request 614 containing the identity 504 of the CPE 150, as discussed above.

In other cases, the CPE 150 may already belong to the customer 510, and is never in the possession of the network service provider or their agents. In such cases, the customer 510 may be provided with a FQDN 616 and instructions on how to manually send the provisioning request 614 to the FQDN 616 using the CPE 150. In some embodiments, the customer 510 may provide the network service provider with the identity 504 of their CPE 150, so that a job assignment 604 may be staged before the provisioning request 614 is sent. In other embodiments, the FQDN 616 provided to the customer 510 for that particular CPE 150 may be specific enough that the job may be staged without knowing an intrinsic identity such as a serial number or MAC address, and the device family 503 may be determined at the time of receiving the provisioning request 614. In cases where only a single CPE 150 is being provisioned for a premises 512, for a particular static public IP address, the IP address of the CPE 150 may be sufficient to link the job assignment 604 to the CPE 150.

In some embodiments, the FQDN 616 may be unique to a device family 503. In other embodiments, an FQDN 616 may be unique to a specific device, which may be advantageous in cases where the network service provider never has physical access to the CPE before the provisioning.

A DNS server 506 resolves the FQDN 616 to the public IP 618 of the ZTP server 501. See 'circle 5'. The FQDN 616 was previously established using an a-record 602, which the DNS server 506 uses to resolve the IP address. In some embodiments, the creation of a-records 602 to establish FQDNs 616 for use in zero touch provisioning may be done manually, but in other embodiments, the FQDNs 616 may be created automatically by the ZTP server 401.

The provisioning request 614 moves on to the public IP address 618 provided by the DNS server 506. In some embodiments, the IP address 618 leads to a firewall 508 or edge server that stands between the ZTP server 501 and the rest of the internet. As is known in the art, the firewall may make use of an access list or other authentication method to determine that this particular CPE 150 is allowed to speak with the ZTP server 501. The request 614 is passed on to the private IP address of the server 501.

Next, the device family 503 of the CPE 504 is determined. See 'circle 6'. The device family 503 needs to be determined at some point in the provisioning process, in order to know which device profile(s) 612 should be used to provision a COS template 610 for the CPE 150. In some embodiments, a FQDN 616 is created for each device family 503 and each CPE 150 being provisioned is either preconfigured or manually instructed to send a provisioning request 614 to the appropriate FQDN 616. All of these FQDN's 616 lead back to the same place: the ZTP server 501. However, the server 501 or the firewall 508 will see which FQDN 616 the provisioning request 614 was redirected from by the DNS server 506, and thus know the device family 503.

Another method the ZTP server 501 may use to determine which device family 503 a CPE belongs to, based on the provisioning request 614 sent by the CPE 150, is using the identity 504 contained within the provisioning request 614 and unique to that CPE 150. Many unique identities, such as MAC addresses and sometimes even serial numbers, may be resolved to, at the very least, a manufacturer, and in some cases they may be resolved down to a model as well.

Next, the COS template is pushed down to the CPE 150 with the identity 504 matching the job assignment 604. See 'circle 7'. According to various embodiments, the COS template 610 is pushed down to the CPE 150. The method of pushing the COS template to the CPE 150 may include, but is not limited to HTTP, HTTPS, FTP, and the like.

Finally, the CPE applies the COS template. See 'circle 8'. After receiving the COS template 610, the CPE 150 performs the various configuration and service provisioning processes indicated in the COS template 610, such that the CPE 150 is properly configured for operation with the service provider network and properly configured for delivering the appropriate network services to the customer 510.

The following is a specific but non-limiting example of a ZTP server 501 being used to zero-touch provision a CPE device. A customer wishes to switch to a different network service provider, and at the same time expand the service they are using. Specifically, they wish to establish a PBX system, to function alongside the VLAN already in place. Rather than sending a field technician to install the new CPE and reconfigure the old CPE, requiring the customer to wait for the technician to be available and increasing the expense of the transition, the new network service provider simply records the details regarding the desired services, including the specifics for the VLAN set up on older CPE equipment by another provider. A new CPE is immediately shipped to the customer after its serial number is noted in the ZTP server management system, alongside all of the information received from the customer. The new CPE device arrives the next day. While the CPE was in transit, the network service provider created a CSNR that details the desired PBX system for that customer location, the service information needed, and the identity (i.e. serial number) of the CPE being sent.

At the same time, the ZTP server provisions a new FQDN that is specific to this new customer, at this location, for their legacy CPE used to create a VLAN. Another CSNR is created detailing the VLAN and all associated service information obtained from the customer. A job assignment is created for the VLAN, pointing to the new, unique FQDN. Another job assignment is created for the PBX, including the serial number of the CPE that is in transit.

When the new CPE device is first plugged into the customers network, it executes a script that was flashed onto the CPE memory by the manufacturer. First, it obtains an IP address using DHCP, and then it sends a provisioning request containing its own serial number to an FQDN established for that particular type of CPE that the network service provider prefers for creating PBX systems. The FQDN resolves to the IP address of the ZTP server. Upon examination of the provisioning request, the server 501 determines that it has a job assignment matching that serial number. That job assignment is pointing to an already provisioned COS template stored and waiting. The COS template is sent back to the new CPE, which executes it and configures itself into the desired PBX system.

The customer, following instructions provided by the new network service provider, manually instructs their old CPE to send a provisioning request to the FQDN provided by the service provider, that is unique to that CPE at that location. This FQDN resolves to the ZTP server. Upon seeing that the provisioning request is arriving from that very specific FQDN, the ZTP server identifies the device family that the legacy CPE unit belongs to using a detected MAC address. Upon determining the device family, the job assignment is pointed to the appropriate device profile for VLAN implemented with that equipment. A COS template is provisioned and pushed down to the legacy CPE, which uses the COS template to configure itself to be managed and maintained by the new service provider. All of this happening without needing intervention from a field technician, lengthy delays, or additional costs.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/ arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide functions as described herein, such as an apparatus comprising a processor and a memory communicatively connected to the processor, the processor configured to perform these functions as described above with respect to the various figures.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims. It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

The invention claimed is:

1. A method for zero touch provisioning, performed by a zero touch provisioning (ZTP) server in a network, the method comprising:
   receiving a customer specification of network requirements (CSNR) exclusively specified for a customer premises equipment (CPE) belonging to a device family and assigned to a specific customer at a specific customer premises, the CSNR received prior to the CPE being plugged into a network link at the specific customer premises for a first time and comprising information describing the specific customer premises and information describing an intended operation to be provided by the CPE for the specific customer, the CPE being preconfigured to send a provisioning request to a fully qualified domain names (FQDN) unique to the device family and pointed at an IP address of the ZTP server, the provisioning request sent in response to the CPE being plugged into the network link at the specific customer premises for the first time, wherein CPEs belonging to the same device family are configurable using a shared device profile;
   storing, prior to receiving the provisioning request from the CPE, a job assignment comprising an identity that is unique to the CPE and service information for the zero touch provisioning of the intended operation of the CPE based on the CSNR, the identity being linked to the specific customer through the job assignment;
   provisioning a class of service (COS) template by selecting and populating at least one device profile defined for the device family with the service information of the job assignment, the COS template exclusively created for providing the intended operation of the CPE at the specific customer premises and paired with the identity of the CPE through at least the job assignment;
   receiving, from the CPE, the provisioning request sent by the CPE to the FQDN in response to the CPE being plugged into the network link for the first time, the provisioning request comprising the identity of the CPE; and
   pushing, to the CPE, the COS template provisioned using the job assignment matching the identity of the CPE, to configure the CPE for performing the intended operation;
   wherein the device family is one of a CPE manufacturer and a CPE model.

2. The method of claim 1, wherein the COS template is provisioned after the provisioning request is received from the CPE.

3. The method of claim 1, wherein the service information comprises information related to service attributes of at least one of a point-to-point protocol (PPP), local area network (LAN) data, a quality of service (QoS), dynamic host configuration protocol (DHCP), virtual local area network (VLAN), virtual private network (VPN) data, transmission system 1 (T1), primary rate interface (PRI) data, SIP trunking, SIP proxy server requests, and multiprotocol label switching (MPLS).

4. A system for zero touch provisioning comprising:
   a customer premises equipment (CPE) assigned to a specific customer at a specific customer premises, the CPE belonging to a device family, the CPE communicatively coupled to a network through a network link at the specific customer premises, wherein CPEs belonging to the same device family are configurable using a shared device profile; and
   a zero touch provisioning (ZTP) server comprising a processor and a memory, the ZTP server configured to:
   receive a customer specification of network requirements (CSNR) exclusively specified for the CPE, the CSNR comprising information describing the specific customer premises and information describing an intended operation to be provided by the CPE for the specific customer;
   store a job assignment comprising an identity that is unique to the CPE and service information for the zero touch provisioning of the intended operation of the CPE based on the CSNR, the identity being linked to the specific customer through the job assignment;
   provision a class of service (COS) template using information originating from the CSNR by selecting and populating at least one device profile defined for the device family with the service information of the job assignment, the COS template exclusively created for providing the intended operation of the CPE at the specific customer premises and paired with the identity of the CPE through at least the job assignment;
   receive, from the CPE, a provisioning request sent by the CPE from the network link at the specific customer premises to a fully qualified domain name (FQDN) unique to the device family and resolving to an IP address of the ZTP server, the provisioning request comprising the identity of the CPE, wherein the CSNR is received and the job assignment is stored before the provisioning request is received; and push, to the CPE over the network, the COS template unique to the job assignment matching the identity received in the provisioning request, to configure the CPE for performing the intended operation.

5. The system of claim 4, wherein the device family is one of a CPE manufacturer and a CPE model.

6. The system of claim 4, wherein the CPE is preconfigured to send the provisioning request to the FQDN in response to the CPE being plugged into the network link at the specific customer premises for a first time.

7. The system of claim 4, the ZTP server further configured to determine the device family of the CPE using the provisioning request received from the CPE.

8. The system of claim 7, wherein the ZTP server is further configured to determine the device family of the CPE by identifying the FQDN through which the ZTP server receives the provisioning request.

9. The system of claim 7, wherein the ZTP server is further configured to determine the device family of the CPE using one of a serial number and a MAC address received in the provisioning request and resolvable to at least the device family of the CPE.

10. The system of claim 4, wherein the COS template is provisioned after the provisioning request is received from the CPE.

11. The system of claim 4, wherein the service information comprises information related to service attributes of at least one of a point-to-point protocol (PPP), local area network (LAN) data, a quality of service (QoS), dynamic host configuration protocol (DHCP), virtual local area network (VLAN), virtual private network (VPN) data, transmission system 1 (T1), primary rate interface (PRI) data, SIP trunking, SIP proxy server requests, and multiprotocol label switching (MPLS).

12. A method for zero touch provisioning, performed by a zero touch provisioning (ZTP) server in a network, the method comprising:

receiving a customer specification of network requirements (CSNR) exclusively specified for a customer premises equipment (CPE) assigned to a specific customer at a specific customer premises, the CSNR received prior to the receipt of a provisioning signal from the CPE from a network link at the specific customer premises, the CSNR comprising information describing the specific customer premises and information describing an intended operation to be provided by the CPE for the specific customer;

storing, prior to receiving the provisioning request from the CPE, a job assignment comprising an identity that is unique to the CPE and service information for the zero touch provisioning of the intended operation of the CPE based on the CSNR, the identity being linked to the specific customer through the job assignment;

provisioning a class of service (COS) template using information originating from the CSNR, the COS template exclusively created for providing the intended operation of the CPE at the specific customer premises and paired with the identity of the CPE through at least the job assignment;

receiving, from the CPE, the provisioning request sent by the CPE from the network link at the specific customer premises to a fully qualified domain names (FQDN) pointed at an IP address of the ZTP server, the provisioning request comprising the identity of the CPE; and pushing, to the CPE, the COS template unique to the job assignment matching the identity of the CPE, to configure the CPE for performing the intended operation.

13. The method of claim 12:

wherein the CPE belongs to a device family;

wherein the FQDN is unique to the device family;

wherein the provisioning of the COS template comprises selecting and populating at least one device profile defined for the device family with the service information of the job assignment; and wherein CPEs belonging to the same device family are configurable using a shared device profile.

14. The method of claim 13, wherein the device family is one of a CPE manufacturer and a CPE model.

15. The method of claim 13, wherein the device family of the CPE is determined by the ZTP server using the provisioning request received from the CPE.

16. The method of claim 15, wherein the device family of the CPE is determined based on the FQDN through which the ZTP server receives the provisioning request.

17. The method of claim 15, wherein the device family of the CPE is determined through one of a serial number and a MAC address received in the provisioning request and resolvable to at least the device family of the CPE.

18. The method of claim 13, wherein the COS template is provisioned after the provisioning request is received from the CPE.

19. The method of claim 12, wherein the CPE is preconfigured to send the provisioning request to the FQDN in response to the CPE being plugged into a network link at the specific customer premises for a first time.

20. The method of claim 12, wherein the service information comprises information related to service attributes of at least one of a point-to-point protocol (PPP), local area network (LAN) data, a quality of service (QoS), dynamic host configuration protocol (DHCP), virtual local area network (VLAN), virtual private network (VPN) data, transmission system 1 (T1), primary rate interface (PRI) data, SIP trunking, SIP proxy server requests, and multiprotocol label switching (MPLS).

* * * * *